United States Patent
Ogman et al.

(10) Patent No.: US 6,792,261 B2
(45) Date of Patent: Sep. 14, 2004

(54) MOBILE COLLECT CALL SYSTEM AND METHOD

(75) Inventors: Lipa Ogman, Reut (IL); David Shwarzman, Lod (IL); Alon Nurel, Modiin (IL); Dmitry Gitlin, Tel Aviv (IL); Itzik Woda, Oranit (IL)

(73) Assignee: Cellcom Israel Limited, Herzliya Pituach (IL)

(*) Notice: Subject to any disclaimer, the term of this patent is extended or adjusted under 35 U.S.C. 154(b) by 0 days.

(21) Appl. No.: 10/083,513

(22) Filed: Feb. 27, 2002

(65) Prior Publication Data

US 2003/0162526 A1 Aug. 28, 2003

(51) Int. Cl.[7] ............................................. H04Q 7/20
(52) U.S. Cl. ...................................................... 455/403
(58) Field of Search .......................... 455/403; 379/112; 370/217

(56) References Cited

U.S. PATENT DOCUMENTS

| | | | |
|---|---|---|---|
| 4,713,806 A | * | 12/1987 | Oberlander et al. |
| 5,706,330 A | | 1/1998 | Bufferd et al. |
| 6,041,108 A | | 3/2000 | Brewster et al. |
| 6,138,006 A | | 10/2000 | Foti |
| 6,298,123 B1 | * | 10/2001 | Nolting et al. ............... 379/112 |
| 6,373,817 B1 | * | 4/2002 | Kung et al. .................. 370/217 |

* cited by examiner

*Primary Examiner*—William Cumming
(74) *Attorney, Agent, or Firm*—Birch, Stewart, Kolasch & Birch, LLP (57) ABSTRACT

Systems and methods for providing collect call service are disclosed. In a preferred embodiment, the system includes: at least one mobile switching center (MSC) configured to service a first mobile station and a second mobile station, wherein the MSC (MSC-O) among the at least one MSC which services the first mobile station is also configured to receive a collect call indication from the first mobile station; an intelligent network configured to receive a collect call indication from the MSC-O; and an intelligent peripheral configured to establish a first channel with the first mobile station and a second channel with the second mobile station in accordance with indications received from the intelligent network, wherein the intelligent peripheral is configured to receive via the first channel an audio caller identification, and wherein via the second channel the intelligent peripheral is configured to transmit the audio caller identification and to subsequently receive an acceptance or refusal of a collect call, the intelligent peripheral configured to join the first and second channels and thereby connect the first and second mobile stations if acceptance is received.

14 Claims, 9 Drawing Sheets

MOBILE COLLECT CALL SYSTEM AND METHOD

FIELD AND BACKGROUND OF THE INVENTION

The present invention relates to radio telecommunication networks (also known as mobile networks or wireless networks).

Mobile stations are widely used. Users purchase mobile stations for a variety of reasons such as convenience, increased availability for receiving calls, safety concerns, etc. Today, even members of population sectors which were traditionally viewed as not having large amounts of disposable income such as students, soldiers, pensioners, etc. carry mobile stations.

Typically, users of mobile stations pay a provider for usage of network infrastructure either on a periodic basis (for incurred charges such as calls, is periodic fees, etc.) or on a prepaid basis, In some networks, for a call where the calling party and the called party both have mobile stations, the calling part pays for the entire call but in other networks the cost of the call may be shared between the calling party and the called party.

U.S. Pat. No. 6,138,006 to Foti discloses in a radio telecommunications network, a system and method of informing a called mobile station operating in a visited mobile switching center (V-MSC) that an incoming call is a collect call prior to delivering the incoming call to the mobile station. The system obtains in an originating mobile switching center (O-MSC), a collect call prefix from a calling party and determines from the collect call prefix that the incoming call is a collect call. A collect call indication (CCI) is generated and sent along with the calling number to the V-MSC in a Location Request (LocReq) Invoke message and a Routing Request (RoutReq) Invoke message, thereby notifying the V-MSC that there is an incoming call for the mobile station and the incoming call is a collect call. The V-MSC sets a collect call flag to ON, stores the calling number in a subscriber record in the V-MSC, and determines whether the mobile station is a digital mobile station. If so, a Short Message Service (SMS) message including the calling number is sent to the mobile station informing the subscriber that the incoming call is about to be delivered and the incoming call is a collect call. If the mobile station is a dual-capable mobile station, a distinctive ringing signal is sent to the mobile station. The incoming call is then delivered to the mobile station, and the subscriber may choose to answer or not. The collect call flag is then reset to OFF in the subscriber record in the V-MSC.

It should be noted that according to the SMS standard, there is no requirement that a message arrive before the call is established, rendering the SMS (digital) solution of the above mentioned patent difficult to implement.

Furthermore, in the above mentioned patent, the methods used to indicate to the called party that the incoming call is a collect call, make it difficult for the called party to make an informed decision on whether to accept the call. If a distinctive ringing signal is used the called pay makes a choice of accepting the call or not without knowing who is the calling party, Assuming a message with a phone number is implementable and used, then in order to make an informed decision the called party must expeditiously associate the indicated phone number with the correct calling party.

Again assuming SMS is implementable, another drawback relates to the variation in cost between collect calls (generally priced higher) and direct dial. A called party who receives the phone number of the mobile station of the calling party has an incentive to reject the call and call back the received phone number, relying on the high probability that the called party will reach the calling party even after a lapse of time because of the mobility of the mobile station.

What is needed in the art are systems and methods for collect calls in a radio telecommunications network which allow the called party to make au informed decision on whether to accept the call. What is also needed in the art are systems and methods which deliver collect calls to called parties only when appropriate. What is also needed in the art are, systems and methods for collect calls in a digital radio telecommunications network

SUMMARY OF THE INVENTION

According to the present invention, there is provided a method for providing collect call service between mobile stations, including: receiving an indication that a call from a first mobile station is a collect call; establishing a first channel with the first mobile station; transmitting an audio request for an audio caller identification to the first mobile station via the first channel; receiving the audio caller identification via the first channel; establishing a second channel with a second mobile station; transmitting the received audio caller identification to the second mobile station via the second channel; and if in response to the transmitting the received audio caller identification, an acceptance indication for the collect call is received from the second mobile station, connecting the first mobile station and the second mobile station to each other.

According to the present invention, there is also provided a method for providing collect call service between mobile stations, including: receiving an indication that a call from a first mobile station is a collect call; receiving a destination identifier for a second mobile station; checking status information of the second mobile station corresponding to the received destination identifier; depending on results of the checking, deciding whether to establish a first channel with the first mobile station or to end the method; if a first channel is established, (i) transmitting an audio request for an audio caller identification to the first mobile station via the first channel, (ii) receiving the audio caller identification via the first channel, (iii) establishing a second channel with the second mobile station and transmitting the received audio caller identification to the second mobile station via the second channel, and (iv) if in response to the transmitting the received audio caller identification, an acceptance indication for the collect call is received from the second mobile station, connecting the first mobile station and the second mobile station to each other.

According to the present invention, there is further provided a system for providing collect call service between mobile stations, including: at lest one mobile switching center (MSC) configured to service a first mobile station and a second mobile station, wherein the MSC (MSC-O) among the at least one MSC which services the first mobile station is also configured to receive a collect call indication from the first mobile station; an intelligent network configured to receive a collect call indication from the MSC-O; and an intelligent peripheral configured to establish a first channel with the first mobile station and a second channel with the second mobile station in accordance with indications received from the intelligent network, wherein the intelligent peripheral is configured to receive via the first channel an audio caller identification, and wherein via the second channel the intelligent peripheral is configured to transmit the audio caller identification and to subsequently receive an acceptance or refusal of a collect call, the intelligent peripheral configured to join the first and second channels and thereby connect the first and second mobile stations if acceptance is received.

According to the present invention, there is still further provided a system for providing collect call service between mobile stations, including: at least one mobile switching center (MSC) configured to service a first mobile station and a second mobile station, wherein the MSC (MSC-O) among the at least one MSC which services the first mobile station is also configured to receive a collect call indication from the first mobile station; an interactive voice response system (IVR) configured to receive a collect call indication from the MSC-O, configured to establish a first channel with a first mobile station and a second channel with a second mobile station, wherein the TVR is configured to receive via the first channel an audio caller identification, and is configured to transmit the audio caller identification via the second channel and to subsequently receive an acceptance or refusal of a collect call via the second channel, said IVR joining the first and second channels and thereby connecting the first and second mobile stations if acceptance is received.

According to the present invention, there is provided a memory readable by machine tangibly embodying a program of instructions executable by the machine to perform method steps for providing collect call service between mobile stations, comprising: receiving an indication that a call from a first mobile station is a collect call; establishing a first channel with the first mobile station; transmitting an audio request for an audio caller identification to the first mobile station via the first channel; receiving the audio caller identification via the first channel; establishing a second channel with a second mobile station; transmitting the received audio caller identification to the second mobile station via the second channel; and if in response to the transmitting the received audio caller identification, an acceptance indication for the collect call is received from the second mobile station, connecting the first mobile station and the second mobile station to each other.

According to the present invention, there is also provided a computer program product comprising a computer useable medium having computer readable program code embodied therein for providing collect call service between mobile stations, the computer program product comprising: computer readable program code for causing a computer to receive an indication that a call from a first mobile station is a collect call; computer readable program code for causing the computer to establish a first channel with the first mobile station; computer readable program code for causing the computer to transmit an audio request for an audio caller identification to the first mobile station via the first channel; computer readable program code for causing the computer to receive the audio caller identification via the first channel; computer readable program code for causing the computer to establish a second channel with a second mobile station; computer readable program code for causing the computer to transmit the received audio caller identification to the second mobile station via the second channel; and computer readable program code for causing the computer to connect the first mobile station and the second mobile station to each other, if in response to the transmitting the received audio caller identification, an acceptance indication for the collect call is received from the second mobile station.

According to the present invention, there is further provided, a memory readable by machine, tangibly embodying a program of instructions executable by the machine to perform method steps for providing collect call service between mobile stations, comprising: receiving an indication that a call from a first mobile station is a collect call; receiving a destination identifier for a second mobile station; checking status information of the second mobile station corresponding to the received destination identifier; depending on results of the checking, deciding whether to establish a first channel with the first mobile station or to end the method; and if a first channel is established, (i) transmitting an audio request for an audio caller identification to the first mobile station via the first channel, (ii) receiving the audio caller identification via the first channel, (iii) establishing a second channel with the second mobile station and transmitting the received audio caller identification to the second mobile station via the second channel, and (iv) if in response to the transmitting the received audio caller identification, an acceptance indication for the collect call is received from the second mobile station, connecting the first mobile station and the second mobile station to each other.

According to the present invention there is still further provided, a computer program product comprising a computer useable medium having computer readable program code embodied therein for providing collect call service between mobile stations, comprising: computer readable program code for causing a computer to receive an indication that a call from a first mobile station is a collect call; computer readable program code for causing the computer to receive a destination identifier for a second mobile station; computer readable program code for causing the computer to check status information of the second mobile station corresponding to the received destination identifier; computer readable program code for causing the computer to decide whether to establish a first channel with the first mobile station or to end the method depending on results of the checking; and computer readable program code for causing the computer if a first channel is established to, (i) transmit an audio request for an audio caller identification to the first mobile station via the first channel, (ii) receive the audio caller identification via the first channel, (iii) establish a second channel with the second mobile station and transmit the received audio caller identification to the second mobile station via the second channel, and (iv) if in response to the transmitting the received audio caller identification, an acceptance indication for the collect call is received from the second mobile station, connect the first mobile station and the second mobile station to each other.

BRIEF DESCRIPTION OF THE DRAWINGS

The invention is herein described, by way of example only, with reference to the accompanying drawings, wherein.

DESCRIPTION OF THE PREFERRED EMBODIMENTS

A preferred embodiment of the present invention is of collect call systems and methods for radio telecommunications networks.

The principles and operation of mobile collect call service according to the present invention may be better understood with reference to the drawings and the accompanying description. All examples given below are non-limiting illustrations of the invention described and defined herein.

Figure 1A:
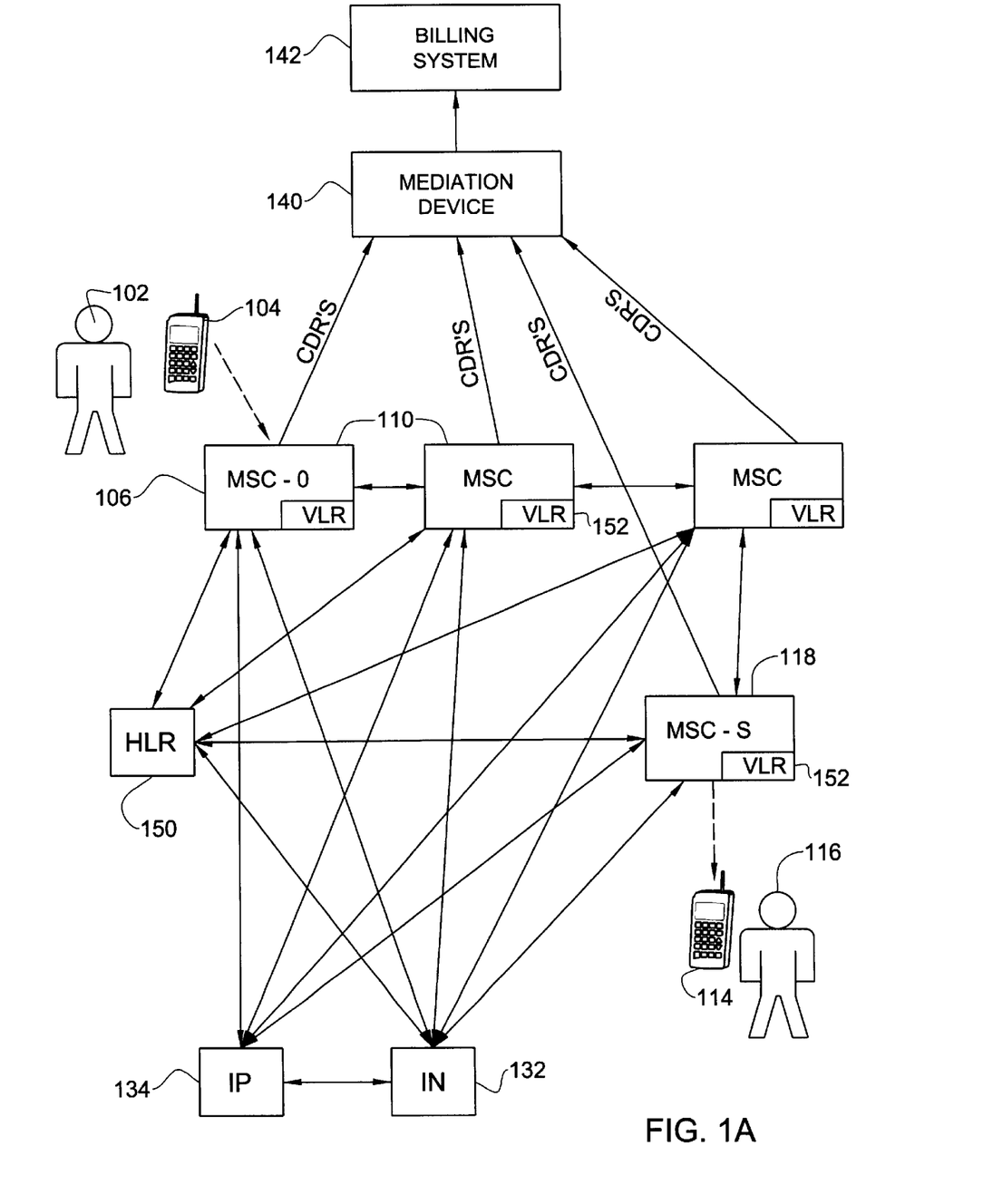
FIG. 1A is a block diagram of a mobile network in accordance with a preferred embodiment of the present invention.

Referring now to the drawings, FIG. 1A illustrates a radio telecommunication network 100, in accordance with a preferred embodiment of the present invention. It is assumed that there is at least one mobile switching center (MSC) 110 in network 100. In FIG. 1, four MSC's are shown for the purposes of illustration, however it should be evident that a larger or smaller number of MSC's 110 can be used instead, As is well known in the art, MSC's 110 switch voice and signals.

In the illustrated embodiments each MSC 110 is connected via a line (typically physical) to one other MSC 110. In other preferred embodiments, all MSC's may be connected to one another. In still other preferred embodiments, there may also be one or more signaling transfer points (STP's) through which signals pass.

All MSC's 110 are configured to connect to an intelligent network (IN) 132 and to an intelligent peripheral (IP) 134 either directly or through one or more gateways. For example, in some embodiments (not shown) one MSC 110 is a designated host mobile switching center (MSC-H) and acts as a gateway through which all other MSC's 110 communicate with IN 132 and IP 134. For simplicity of explanation in the discussion below it is assumed that there is no designated MSC-H.

IN 132 and IP 134 may be for example compliant with the standard ISCP/WN.

The MSC 110 which services the (current) calling mobile station (MS) 104 is termed the originating mobile switching center (MSC-O) 106. The MSC 110 which services the (current) called MS 114 is termed the servicing mobile switching center (MSC-S) 118. In some preferred embodiments all MSC-s 110 are capable of serving as the MSC-O and/or the MSC-S (depending on the location of calling MS 104 and called MS 114) whereas in other preferred embodiments some MSC's 110 are not capable of serving as either an MSC-O or an MSC-S but are used for switching voices and signals across network 100. In the illustrated preferred embodiment, it is assumed that all shown MSC's 110 are capable of serving as an MSC-O and/or as an MSC-S when appropriate.

Depending on the preferred embodiment, certain information related to subscribers to network 100 is accessible by network 100. In some preferred embodiments the information includes a profile which includes invariant parameters related to a subscriber (such as the mobile identification number), and the information includes the status of variable parameters related to a subscriber, i.e. the status of parameters which can take on more than one value (for example whether a mobile has been stolen or not). Hereinbelow, the term "status information" includes invariant and/or variable parameters, as appropriate. For example the status information available for a given subscriber can include whether a subscriber pays by account or is a prepaid customer, the services a subscriber receives (such as caller ID, call screening, voice mail, etc.), whether the mobile of the subscriber has been stolen, and any other information which may be relevant for providing mobile service. The status information of a subscriber can be looked up using any suitable identifier of the subscriber, for example the phone number of the mobile station belonging to the subscriber, the mobile identification number of the mobile station belonging to the subscriber, etc.

Each subscriber is associated with a home location register (HLR) 150, which stores certain status information on that subscriber, HLR 150 is configured to determine which MSC 110, if any, is functioning as MSC-S 118 and currently servicing called MS 114 (belonging to the associated subscriber). It should be evident that a plurality of subscribers can be divided among more than one HLR 150, however for simplicity of explanation, it is assumed in FIG. 1 and the description that all subscribers are associated with the same HLR 150.

Associated with each MSC 110 which is capable of serving as an MSC-O or as an MSC-S is a visiting location register (VLR) 152. Each VLR 152 is configured to receive from HLR 150 and store certain status information related to subscribers currently being serviced by the associated MSC 110 (as an MSC-O and/or as an MSC-S).

In addition, in some preferred embodiments, IN 132 has direct access to some or all status information related to subscribers and therefore can look up the information and take appropriate action without involving retrieval of status information from HLR 150/VLR 152. In the preferred embodiments where access to status information is divided, the division between status information directly accessible to IN 132, status information stored in HLR 150/VLR 152, and status information both directly accessible to IN 132 and stored in HLR 150/VLR 152 may vary depending on the preferred embodiment. For example in one of these preferred embodiments, HLR 150/VLR 152 stores status information that is not updated in real time such as monthly services, subscribers triggers, etc, while IN 132 directly accesses status information that may need to be updated in real time for example customer PIN code. As another example, HLR 150/VLR 152 in some preferred embodiments may store general status information related to subscribers, and IN 132 may directly access status information concerning special caller services. For ease of explanation, it is assumed below that general status information is stored in HLR 150/VLR 152 and that IN 132 verifies and provides services based on the status information or a derivative of the information stored in HLR 150 or VLR 152. It is also assumed for ease of explanation that specific status information concerning special caller services, including collect calf service, is directly accessed by IN 132. However, it should be evident that other access schemes can be implemented mutatis mutandis.

Figure 1B:
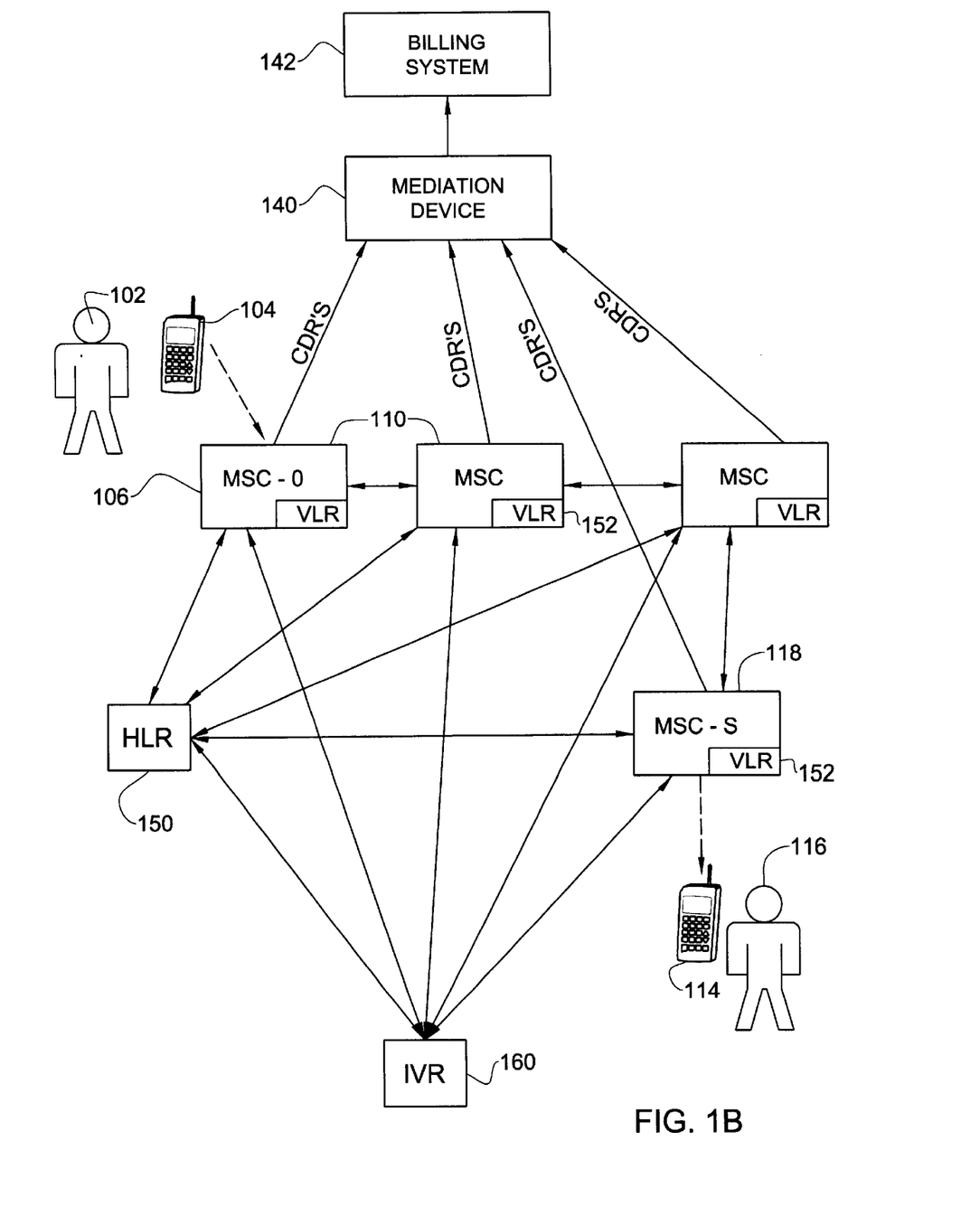
FIG. 1B is a block diagram of a mobile network in accordance with another preferred embodiment of the present invention.

FIG. 1B illustrates a radio telecommunications network according to another preferred embodiment where, the separate elements IP 134 and IN 132 are replaced by an interactive voice response system IVR 160. Whenever the discussion below refers to IP 134 and IN 132, it should be understood to also include the case of the respective functions of an IVR 160 corresponding to the functions of IP 134 and IN 132. Note however that an exemplary standard for communication between IVR 160 and any MSC 110 (such as MSC-O 106 or MSC-S 118) is the ISUP standard and an exemplary standard for communication between IVR 160 and HLR 150 is the IS 41 standard.

A caller (calling part) 102 uses calling MS 104 to reach MSC-O 106. The call is transmitted to MSC-S 118 and from there to called MS 114 used by called part 116. It should be evident that in some cases MSC-O 106 and MSC-S 118 may be identical. For calls requiring special service, IN 132 and IP 134 are also involved in the call process, as will be explained below for collect calls. Each time the call passes through any MSC 110, a call detail recording (CDR) is generated. These CDR's are passed to a mediation device 140 which collects and analyzes the CDR's. Mediation device 140 preferably transfers only the relevant CDR's to a billing system 142. Examples of commercially available mediation devices and billing systems are the Inter-mediatE mediation device available from Intec Telecom Systems, headquartered in Surrey, Great Britain and an Amdocs billing system available from Amdocs Limited headquartered in Chesterfield, Mo., respectively.

For simplicity of presentation, calling MS 104 and called MS 114 are used in the discussion below and attached claims when discussing or reciting the invention, however it should be evident that calling party 102 and called party 116 operate calling MS 104 and called MS 114 respectively, and are therefore implied where appropriate.

Figure 2:
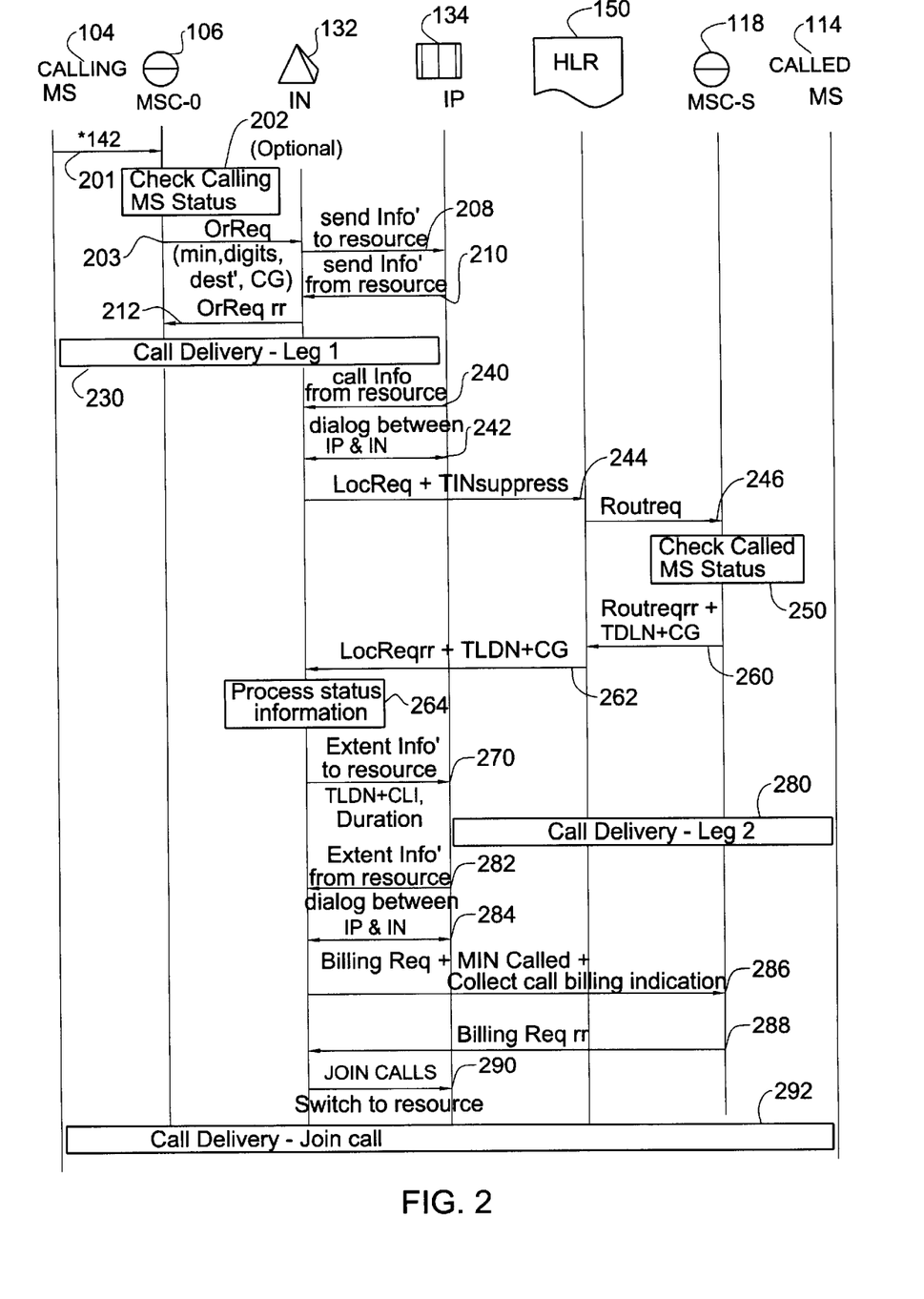
FIG. 2 is a call flow diagram for a collect call, in accordance with a preferred embodiment of the present invention.

FIG. 2 is a call flow diagram for a collect call, in accordance with a preferred embodiment of the present invention. Only the relevant call flows are discussed below. For the sake of example it is assumed in the discussion that the TDMA protocol is used. However it should be evident that collect call service using other protocols can be substituted mutatis mutandis.

Calling MS 104 transmits in signal 201 an indication of a collect call, for example a three or four symbol sequence such as 142 or *142. As an example, signal 201 can conform with the IS 136 standard. In optional step 202, MSC-O 106 upon receiving signal 201 checks status information of calling MS 104 in associated VLR 152 to ensure that calling MS 104 is entitled to make a call. For example MSC-O 106 can check VLR 152 to verify that calling MS 104 has not been reported stolen. Assuming calling MS 104 is entitled to call, MSC-O 106 sends an indication of a collect call to IN 132, in the form of origination request (OrReq) triggering signal 203, thereby triggering the IN 132 and IP 134 sequence for collect call service. OrReq 203 can include, for example, the mobile identification number (MIN) of calling MS 104, the destination digits (i.e. the collect call indication used such as 142 or *142), and the customer group (CG) of calling MS 104. Typically the MIN of a mobile station includes a network identifier plus a unique identifier of the mobile station within the network. IN 134 uses the information retrieved from OrReq 203 to verify that calling MS 104 can invoke the collect call service. For example, in some embodiments if calling MS 104 is not up to date in payments, all outgoing calls including collect calls may be blocked.

In send information to resource signal 208, IN 132 requests from IP 134 a connection number for establishing a channel between calling MS 104 and IP 134. IP 134 returns the connection number to IN 132 in send information from resource signal 210, whereupon IN 132 returns the connection number to MSC-O 106 in origination request return result signal 212. As an example, signal origination request 203 and signal origination request return result 212 can conform with the IS 41 standard, and signal send information to resource 208 and signal send information from resource 210 can conform with the SR 3511 standard.

A channel 230 is then established between IP 134 and calling MS 104. Channel 230 allows the flow of voice and optionally also dual tone multi-frequency (DTMF) between calling MS 104 and IP 134 (via MSC-O 106). For example, channel 230 can comply with the ISUP standard. Assuming an ISUP standard, channel 230 also includes the call delivery procedure of ISUP and as such carries ISUP signaling between MSC-O 106 and IP 134.

In call information resource signal 240, IP 134 notifies IN 132 that channel 230 is established.

Figure 3:
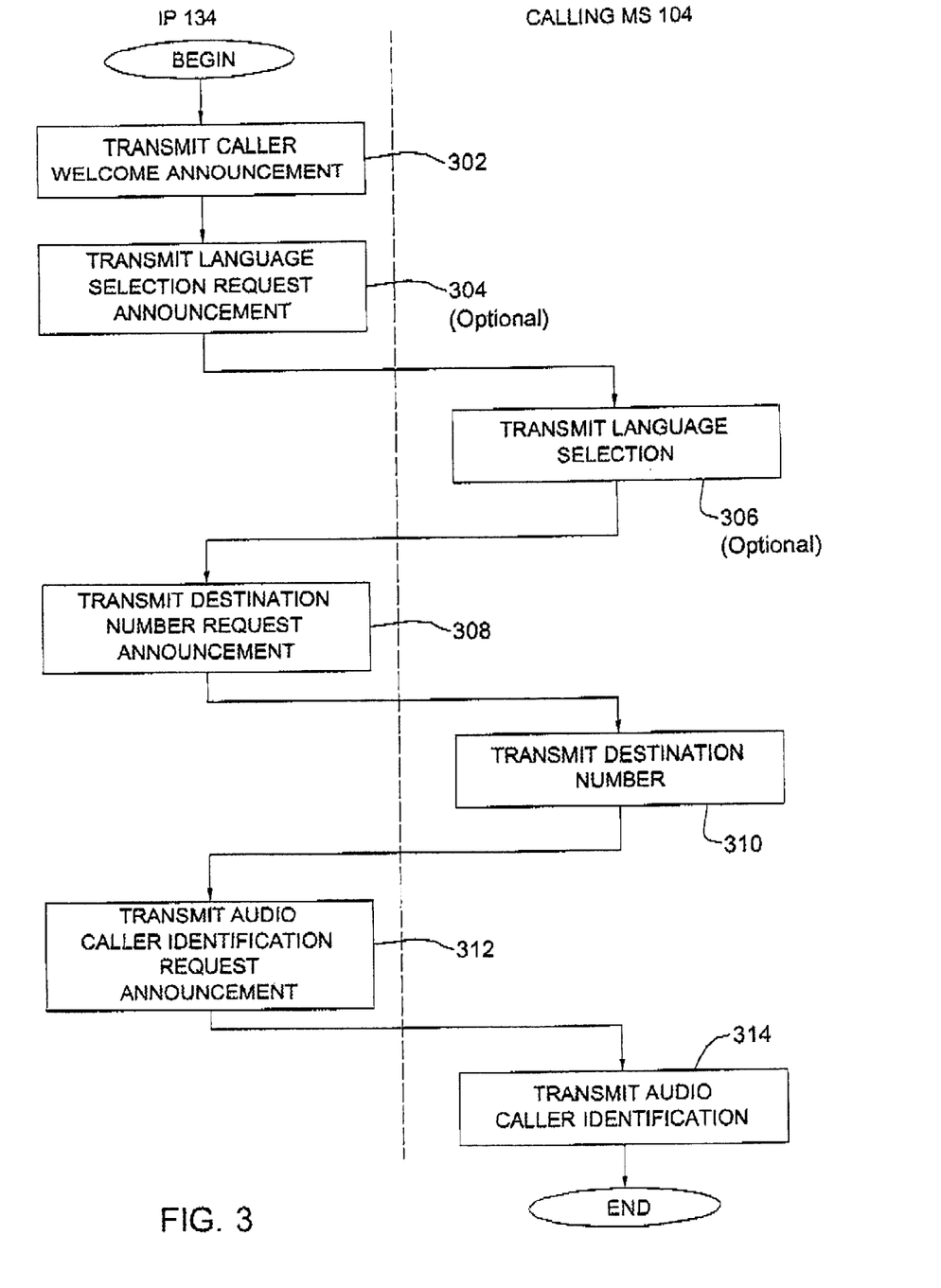
FIG. 3 is a flowchart of an interaction between the intelligent network and the calling mobile station with the intelligent peripheral as the intermediary, in accordance with a preferred embodiment of the present invention.

Refer to FIG. 3 which illustrates the interaction between IN 132 and calling MS 104 via channel 230 with IP 134 as the intermediary, in accordance with a preferred embodiment of the present invention. It should be evident that in other embodiments, the steps shown may be in a different order. Using channel 230, IP 134 transmits a collect call service welcome announcement to calling MS 104 (step 302). In optional step 304, IP 134 transmits an announcement requesting a selection of a preferred announcement language. Calling MS 104 transmits the language selection in optional step 306, which for example was entered on the touch tone pad of calling MS 104. Steps 304 and 306 can be skipped if only one language is available for announcements from IP 134. IP 134 then transmits an announcement to calling MS 104 requesting the destination phone number (phone number of called MS 114) (step 308). Calling MS 104 transmits the destination phone number in step 310, which for if example was entered on the touch tone pad of calling MS 104.

In step 312, IP 134 transmits an announcement to calling MS 104 requesting an audio caller identification. In step 314, calling MS 104 transmits the audio caller identification to IP 134. It should be evident that it is in the interest of calling party 102 to use an identification which is recognizable to called party 116 so that called party 116 will accept the call (see below).

It should also be evident that the interaction between IP 134 and calling MS 104 can include other announcements transmitted by IP 134 and replies transmitted by calling MS 104. For example in some embodiments, there may be conformation announcements, repeating what IP 134 received from calling MS 104 for confirmation by calling MS 104, system problem announcements, hold announcements etc.

Dialog 242 (FIG. 2) represents the dialog between IN 132 and IP 134 which corresponds to the interaction between IP 132 and calling MS 104. For example, dialog 242 can include IN 132 signaling to IP 134 to transmit an appropriate announcement to calling MS 104, and can also include IP 134 transmitting to IN 132 the responses or a derivation of the responses received from MS 104, Call information from resource signal 240 and dialog 242 can comply for example with the SR 3511 protocol.

The dialog 242 may also overlap with IN 132 checking and processing status information. For example, IN 132 can check whether called MS 114 is blocked to collect calls. As another example, IN 132 may check if called MS 114 subscribes to other special services such as call screening, and if affirmative combine the additional subscribed services with the collect call. In some cases, the processing leads to additional interaction between IP 134 and calling MS 104 over channel 230, as well as additional dialog 242 between IN 132 and IP 134. For example, if called MS 114 has call screening, IP 132 may transmit a request for the access code to calling MS 104 over channel 230. As another example, if a collect call is not allowed due to collect call blocking for called MS 114, IP 132 may transmit over channel 230 an announcement such as "The person you have called is blocked to collect calls". (Alternatively, MSC-O 106 may generate this announcement)

If the processing leads to the determination that the collect call can not proceed (for example incorrect access code received from calling MS 104 or blocked access), the method ends.

Assuming the processing yields a determination that the method can proceed, IN 132 converts the received destination phone number into the corresponding MIN number for called MS 114, generates a location request signal 244 which includes the MIN of called MS 114 and sends signal 244 to HLR 150. TINsuppress, included in signal 244, ensures that HLR 150 will not automatically contact IN 132, which is not necessary here because signal 244 originates from IN 132. HLR 150 determines the correct MSC-S 118 currently servicing the called MS 114 corresponding to the received destination MIN and forwards the received MSN to that MSC-S 118 in route-request signal 246.

In step 250 MSC-S 118 looks up status information of called MS 114 in the associated VLR 152. For example, MSC-S 118 can check whether called MS 114 is for a prepaid customer or a periodic-paying customer. As another example, if MS 114 is a prepaid customer MSC-S 118 can check the balance or balance range. MSC-S 118 sends back to HLR 150 a route request return result signal 260 which includes a routing number such as a temporary location directory number (TLDN). Included in route request return result signal 260 is also a customer group (CG) which in the illustrated embodiment represents the looked up status information regarding called MS 114. HLR 150 then sends a location request return result signal 262 to IN 132 including the TLDN and CG. Signals 244, 246, 260 and 262 can conform for example to the IS 41 standard.

In step 264, IN 132 processes the received status information. For example if the received information specifies that called MS 114 is for a prepaid customer and specifies the balance range, IN 132 determines in accordance with a predetermined rule whether the specified balance or balance range is sufficient to allow a collect call. In some cases, the processing leads to additional interaction between IP 134 and calling MS 104 over channel 230, as well as additional dialog 242 between IN 132 and IP 134. For example, if a collect call is not allowed due to the low balance of called MS 114, IP 132 may transmit over channel 230 an announcement such as "The person you have called is not authorized to accept your call". (Alternatively, MSC-O 106 may generate this announcement). If the processing leads to the determination that the collect call can not proceed, the method ends.

Assuming the processing yields a conclusion that the collect call process can proceed, IN 132 transmits an extent information to resource signal 270 to IP 134 including the TLDN, calling line identification (CLI) and duration, for example using the SR 3511 protocol, Signal 270 is an indication to IP 134 to establish a second channel 280, this tine with called MS 114. The sent CLI is the collect call indication used by network 100 (for example *142 or 142) and duration is the amount of time IP 134 should wait before indicating to IN 132 if channel establishment is unsuccessful. In some preferred embodiments, when attempting to establish second channel 280, the source of the call indicated for example on the screen of called MS 114 is the collect call indicator (for example 142 or *142) so that called MS 114 can ignore the call if collect calls are undesired.

Channel 280 allows the flow of voice and optionally also DTMF between called party MS 114 and IP 134 (via MSC-S 118). For example, channel 280 can comply with the ISUP standard. Assuming an ISUP standard, channel 280 also includes the call delivery procedure of ISUP and as such carries ISUP signaling between MSC-S 118 and IP 134.

In call extent information from resource signal 282, for example conforming with the SR 3511 standard. IP 134 notifies IN 132 that channel 280 is established.

Figure 4:
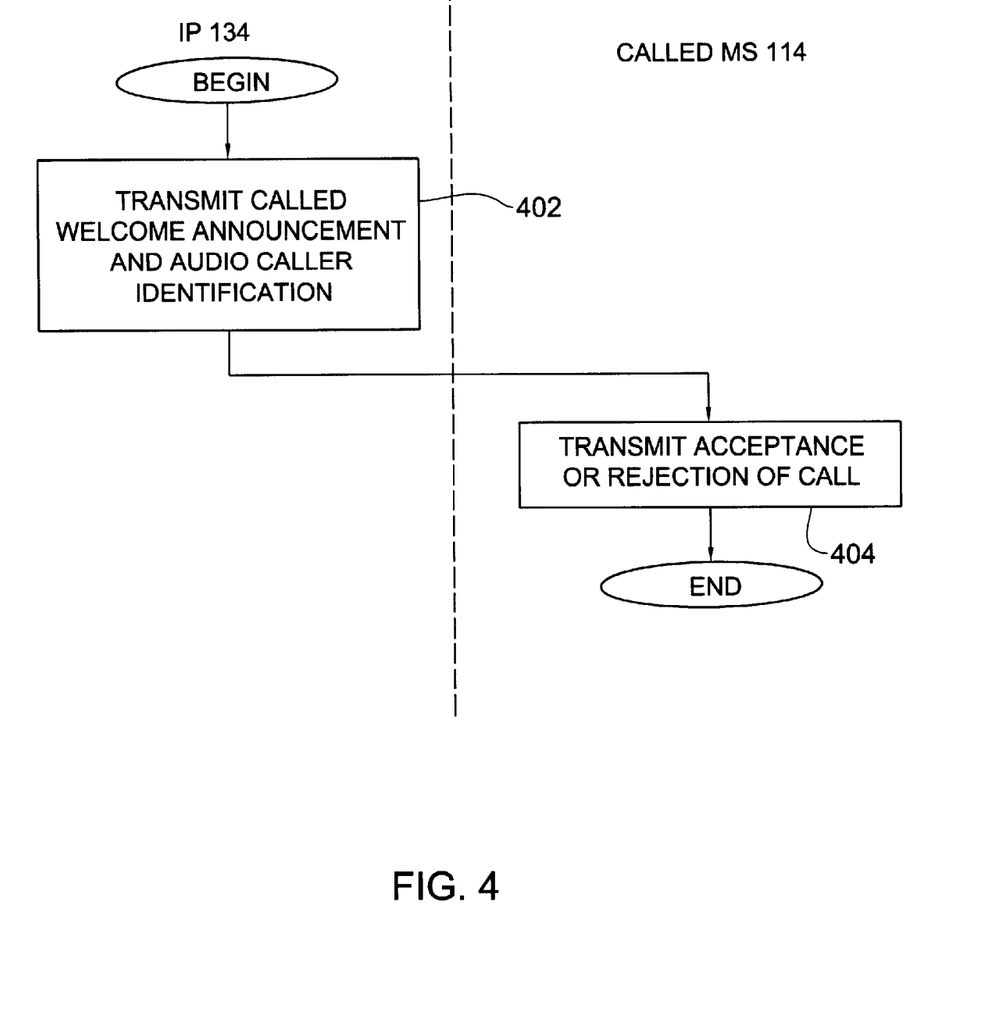
FIG. 4 is a flowchart of an interaction between the intelligent network and the called mobile station with the intelligent peripheral as the intermediate, in accordance with a preferred embodiment of the present invention.

Refer to FIG. 4 which shows the interaction between IN 132 and called party MS 114 via channel 280 with IP 134 as the intermediary, according to a preferred embodiment of the present invention. In step 402, IP 134 transmits a welcome announcement and the audio caller identification from step 314. In step 404, called MS 114 transmits an indication of acceptance or rejection of is the collect call, It should be evident that the interaction can include more announcements by IP 134 and replies by called MS 114, for example, confirmation request announcement and confirmation replies.

Dialog 284 (FIG. 2) represents the dialog between IN 132 and IP 134 which corresponds to the interaction between IP 134 and called MS 114, For example dialog 284 can include m 132 signaling to IP 134 to transmit the appropriate announcement to called MS 114, and IP 134 transmitting the responses or a derivation of the responses received from called MS 114 to IN 132. The dialog conforms for example with the SR 3511 standard. If the collect call is rejected, IP 134 preferably transmits via channel 230 an announcement to calling MS 104 that the call is rejected (or alternatively MSC-O 106 transmits this announcement) and the process ends.

If the collect call is accepted, the process continues with IN 132 transmitting a billing request signal 286 to MSC-S 118. Billing request signal 286 includes the MIN of called MS 114 and a collect call billing indication so that called MS 114 will be billed rather than calling MS 104. In the illustrated embodiment, the transmission of signal 286 allows the charging for the collect call to begin approximately from the time of establishment of channel 280, provided that called MS 114 accepted the call in step 404. MSC-S returns a billing request return result signal 288 to IN 132. Signals 286 and 288 can conform for example to the IS 41 protocol. IN 132 then sends a join calls signal 290 to IP 134 to join calls, for example conforming with SR 3511. The joined channels 230 and 280 are shown as channel 292. Channel 292 allows calling MS 104 and called MS 114 to communicate with each other and for example can conform to the ISUP protocol.

Figure 5:
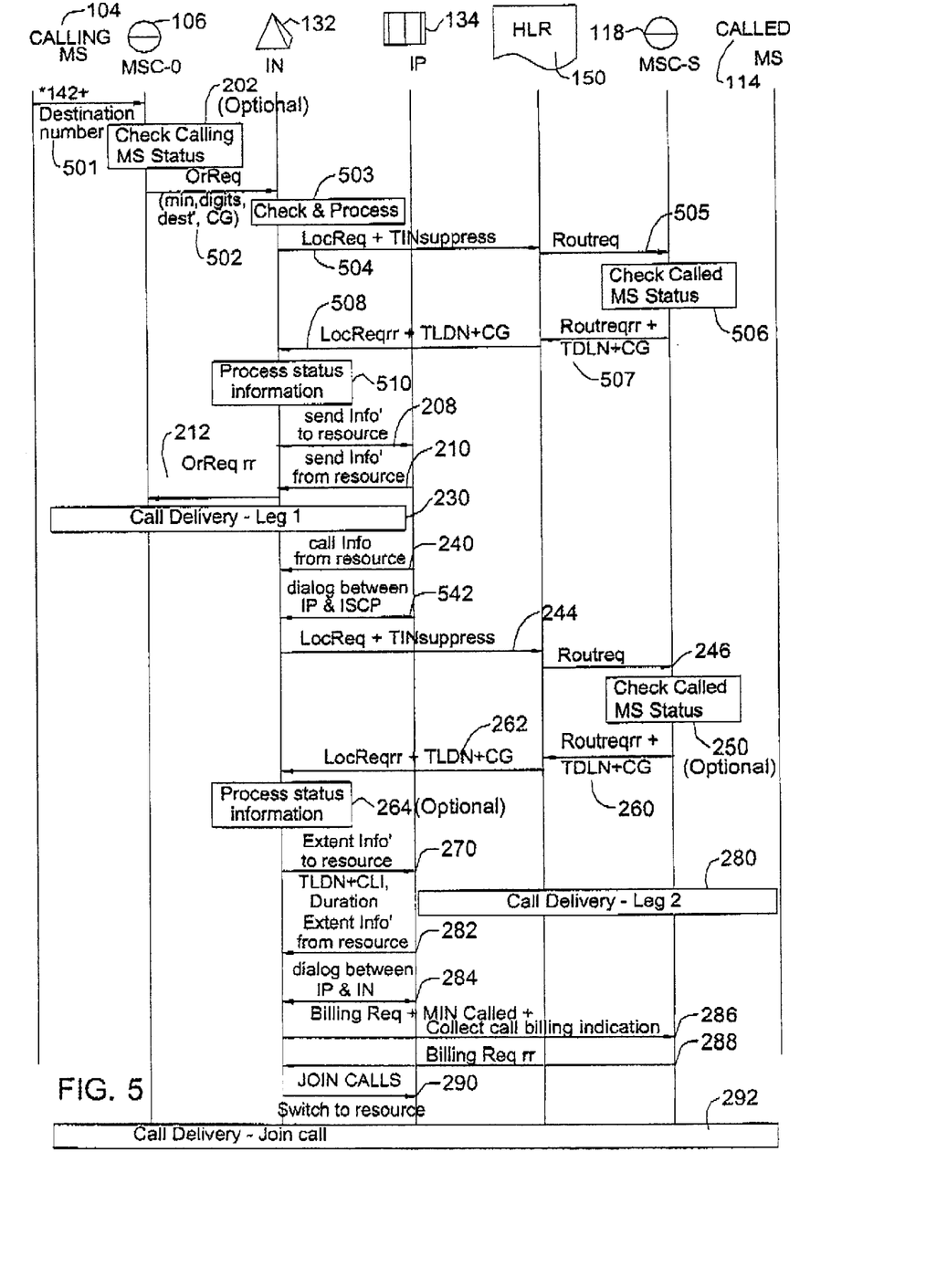
FIG. 5 is a call flow diagram for a collect call, in accordance with another preferred embodiment of the present invention.

FIG. 5 shows a call flow diagram for a collect call, in accordance with another preferred embodiment of the present invention. Only the relevant call flows are discussed below. For the sake of example it is assumed in the discussion that the TDMA protocol is used. However it should be evident that collect call service using other protocols can be substituted mutatis mutandis. Elements that are identical to FIG. 2 have the same number.

In the preferred embodiment illustrated in FIG. 5, the destination phone number of called MS 114 is transmitted by calling MS 104 at the same time as the indication of a collect call, for example a three or four symbol sequence such as 142 or *142 prefixing the destination phone number. In this preferred embodiment, access by calling MS 104 to IP 134 is conditional on the feasibility of a collect call to called MS 114. The limitation on the access to IP 134 may in some cases lower the success rate of malicious attackers attempting system abuse.

Calling MS 104 transits in signal 501 an indication of a collect call plus the destination phone number of called MS 114, for example a three or four symbol sequence such as 142 or *142 prefixing the destination number. As an example, signal 501 can conform with the IS 136 standard. In optional step 202, upon receiving signal 501, MSC-O 106 checks the status information of calling MS 104 in associated VLR 152 to ensure that calling MS 104 is entitled to make a call. For example MSC-O 106 can check VLR 152 to verify that calling MS 104 has not been reported stolen. Assuming calling MS 104 is entitled to call, MSC-O 106 sends an indication of a collect call to IN 132, in the form of origination request (OrReq) triggering signal 502, thereby triggering the IN 132 and IP 134 sequence for collect call service. OrReq 502 can include, for example, the MN of calling MS 104, the destination digits (i.e. the collect call indication used such as 142 or *142 plus the destination phone number of called MS 114), and the customer group (CG) of calling MS 104.

IN 134 uses the information retrieved from OrReq 502 to verify that calling MS 104 can invoke the collect call service. For example, in some embodiments if calling MS 104 is not up to date in payments, all outgoing calls including collect calls may be blocked.

In step 503 IN 132 checks and processes status information related to called MS 114. For example, IN 132 can check whether called MS 114 is blocked to collect calls. If the processing leads to the determination that the collect call can not proceed, the method ends. MSC-O 106 can in some cases subsequently transmit an appropriate announcement to calling MS 104.

If the determination is that the collect call method can proceed, IN 132 converts the received destination phone number into the corresponding MIN for called MS 114, generates a location request signal 504 which includes the MIN called MS 114 and sends signal 504 to HLR 150. TINsuppress, included in signal 504, ensures that HLR 150 will not automatically contact IN 132, which is not necessary here because signal 504 originates from IN 132. HLR 150 determines the correct MSC-S 118 currently servicing the called MS 114 corresponding to the received MIN and forwards the MN to that MSC-S 118 in route-request signal 505.

In step 506 MSC-S 118 looks up status information of called MS 114 in the associated VLR 152. For example, MSC-S 118 can check whether called MS 114 is for a prepaid customer or a periodic-paying customer. As another example, if MS 114 is a prepaid customer MSC-S 118 can check the balance or balance range. In some cases, not all the checks are performed in step 506 and so some are left for a later check (see optional step 250)

MSC-S 118 sends back to ELR 150 a route request return result signal 507 which includes a routing number such as the TLDN. Included in route request return result signal 507 is also a CG which in the illustrated preferred embodiment represents the looked up status information regarding called MS 114. HLR 150 then sends a location request return result signal 508 to IN 132 including the TLDN and CG. Signals 504, 505, 507, and 508 can conform for example to the IS 41 standard.

In step 510, IN 132 processes the received status information. For example if the received information specifies that called MS 114 is for a prepaid customer and specifies the balance or the balance range IN 132 can determine in accordance with a predetermined rule whether the specified balance or balance range is sufficient to allow a collect call.

If the processing leads to the determination that the collect call can not proceed, the method ends. MSC-O 106 can in some cases subsequently transmit an appropriate announcement to calling MS 104.

If the determination is that the collect call method can proceed, in send information to resource signal 208, IN 132 requests from IP 134 a connection number for establishing a channel between calling MS 104 and IP 134. IP 134 returns the connection number to IN 132 in send information from resource signal 210, whereupon IN 132 returns the connection number to MSC-O 106 in origination request return result signal 212. As an example, signal origination request 203 and signal origination request reply 212 can conform with the IS 41 standard, and signal send information to resource 208 and signal send information from resource 210 can conform with the SR 3511 standard.

A channel 230 is then established between IP 134 and calling MS 104. Channel 230 allows the flow of voice and optionally also dual tone multi-frequency (DTME) between calling MS 104 and IP 134 (via MSC-O 106) For example, channel 230 can comply with the ISUP standard. Assuming an ISUP standard, channel 230 also includes the call delivery procedure of ISUP and as such carries ISUP signaling between MSC-O 106 and IP 134.

In call information resource signal 240, IP 134 notifies IN 132 that channel 230 is established.

Figure 6:
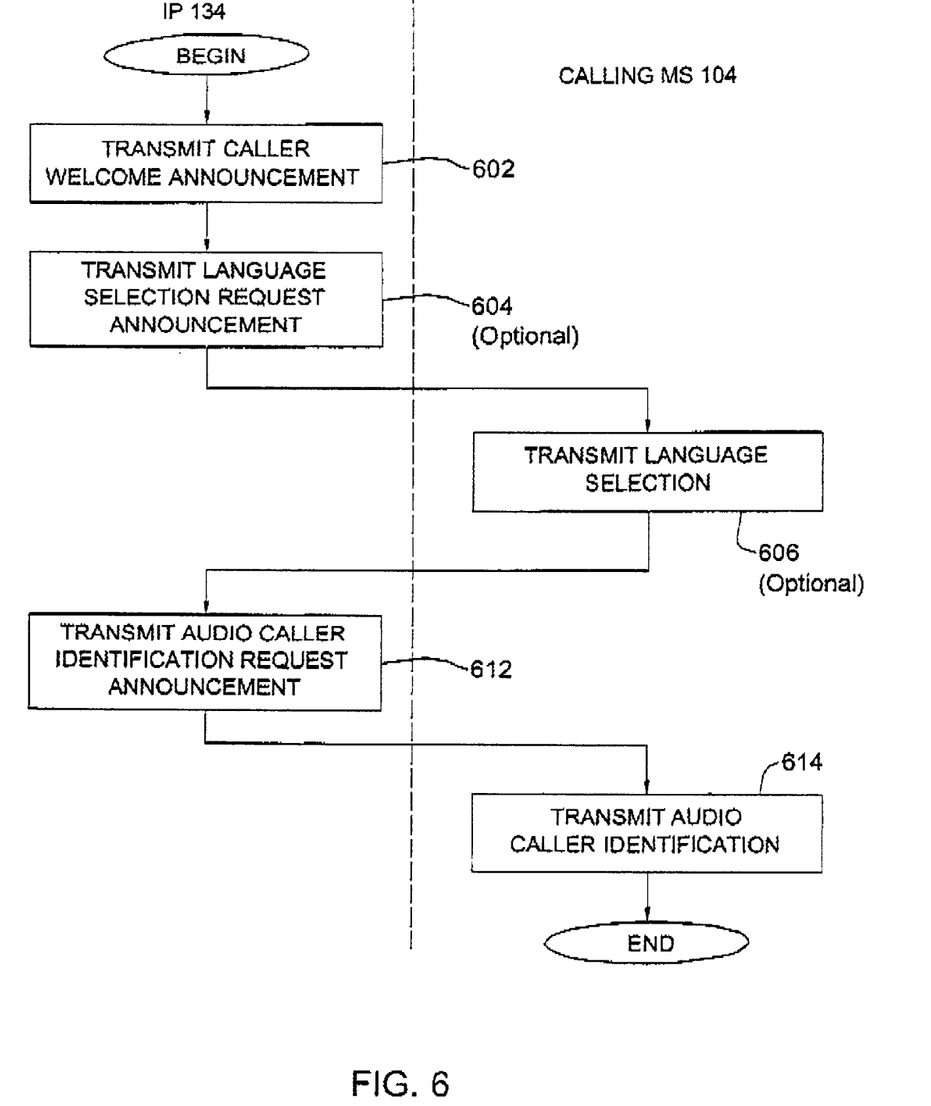
FIG. 6 is a flowchart of an interaction between the intelligent network and the calling mobile station with the intelligent peripheral as the intermediary, in accordance with another preferred embodiment of the present invention.

Refer to FIG. 6 which illustrates the interaction between IN 132 and calling MS 104 via channel 230 with IP 134 as an intermediary, in accordance with a preferred embodiment of the present invention. It should be evident that in other embodiments, the steps show may be in a different order. Using channel 230, IP 134 transmits a collect call service welcome announcement to calling MS 104 (step 602). In optional step 604, IP 134 transmits an announcement requesting a selection of a preferred announcement language. Calling MS 104 transmits the language selection in optional step 606, which for example was entered on the touch tone pad of calling MS 104. Steps 604 and 606 can be skipped if only one language is available for announcements from IP 134.

In step 612, IP 134 transmits an announcement to calling MS 104 requesting an audio caller identification. In step 614, calling MS 104 transmits the audio caller identification to IP 134. It should be evident that it is in the interest of calling party 102 to use an identification which is recognizable to called party 116 so that called party 116 will accept the call (see below)

It should also be evident that the interaction between IP 134 and calling MS 104 can include other announcements transmitted by IP 134 and replies transmitted by calling MS 104. For example in some embodiments, there may be confirmation announcements, repeating what IP 134 received from calling MS 104 for confirmation by calling MS 104, system problem announcements, hold announcements, etc.

Dialog 542 (FIG. 5) represents the dialog between IN 132 and IP 134 which corresponds to the interaction between IP 132 and calling MS 104. For example, dialog 542 can include IN 132 signaling to IP 134 to transmit an appropriate announcement to calling MS 104, and can also include IP 134 transmitting to IN 132 the responses or a derivation of the responses received from MS 104. Because no destination phone number need be requested in the interaction between calling MS 104 and TP 132, dialog 542 may be shortened compared to dialog 242. Call information from resource signal 240 and dialog 542 can comply for example with the SR 3511 protocol.

The dialog 542 may also overlap with IN 132 checking and processing status information. For example, IN 132 may check if called MS 114 subscribes to other special services such as call screening, and if affirmative combine the additional subscribed services with the collect call. In some cases, the processing leads to additional interaction between IP 134 and calling MS 104 over channel 230, as well as additional dialog 542 between IN 132 and IP 134. For example, if called MS 114 has call screening, IP 132 may transmit a request for the access code to calling MS 104 over channel 230. If the processing leads to the determination that the collect call can not proceed (for example incorrect access code received from calling MS 104), the method ends.

Assuming any processing yields a conclusion that the collect call process can proceed IN 132 generates a second location request signal 244 which again includes the MIN of called MS 114 and sends signal 244 to HLR 150. Note that a second location request signal is required because the TLDN given in association with the first location request may have expired. TINsuppress, included in signal 244, ensures that HLR 150 will not automatically contact IN 132, which is not necessary here because signal 244 originates from IN 132. HLR 150 determines the correct MSC-S 113 currently servicing the called MS 114 corresponding to the received MIN and forwards the MIN to that MSC-S 118 in route-request signal 246.

In some cases MSC-S 118 (which may or may not be the same MSC-S 118 as in the first request) looks up status information of called MS 114 in the associated VLR 152 in optional step 250. The status information looked up may be the same or different than for the first check of step 506. MSC-S 118 sends back to HLR 150 a route request return result signal 260 which includes a routing number such as a temporary location directory number (TLDN), Included in route request return result signal 260 is also a CG which represents in the illustrated embodiment the (second check) looked up status information regarding called MS 114. HLR 150 then sends a location request return result signal 262 to IN 132 including the TLDN and CG. Signals 244, 246, 260 and 262 can conform for example to the IS 41 standard.

In optional step 264, IN 132 processes the received status information. If the processing leads to the determination that the collect call can not proceed, the method ends.

Assuming the processing yields a conclusion that the collect call process can proceed, IN 132 then transmits extent information to resource signal 270 to IP 134 including the TLDN, CLI and duration, for example using the SR 3511 protocol. Signal 270 is an indication to IP 134 to establish a second channel 280, this time with called MS 114. The sent CLI is the collect call indication used by network 100 (for example *142 or 142) and duration is the amount of time IP 134 should wait before signaling IN 132 if channel establishment is unsuccessful. In some preferred embodiments, when attempting to establish second channel 280 the source of the call indicated for example on the screen of called MS 114 is the collect call indicator (for example 142 or *142) so that called MS 114 can ignore the call if collect calls are undesired.

Channel 280 allows the flow of voice and optionally also DTMF between called party MS 114 and IP 134 (via MSC-S 118), For example, channel 280 can comply with the ISUP standard. Assuming an ISUP standard, channel 280 also includes the call delivery procedure of ISUP and as such carries ISUP signaling between MSC-S 118 and IP 134.

In call extent information from resource signal 282, for example conforming with the SR 3511 standard, IP 134 notifies IN 132 that channel 280 is established.

Refer again to FIG. 4. In step 402, IP 134 transmits a welcome announcement and the audio caller identification from step 614. In step 404, called MS 114 transmits an indication of acceptance or rejection of the collect call. It should be evident that the interaction can include more announcements by IP 134 and replies by called MS 114, for example, confirmation request announcement and confirmation replies.

Dialog 284 (FIG. 5) represents the dialog between IN 132 and IP 134 which corresponds to the interaction between IP 134 and called MS 114. For example, dialog 284 can include IN 132 signaling to IP 134 to transmit the appropriate announcement to called MS 114 and IP 134 transmitting the responses or a derivation of the responses received from called MS 114 to IN 132. The dialog 284 conforms for example with the SR 3511 standard. If the collect call is rejected, IP 134 transmits via channel 230 an announcement to calling MS 104 that the call is rejected (or alternatively MSC-O 106 transmits this announcement) and the process ends.

If the collect call is accepted, the process continues with IN 132 transmitting a billing request signal 286 to MSC-S 118. Billing request signal 286 includes called MIN and a collect call billing indication so that called MS 114 will be billed rather than calling MS 104. The transmission of signal 286 allows the charging for the collect call to begin approximately from the time of establishment of second channel 280, provided that the collect call was accepted by called MS 114 in step 404. MSC-S returns a billing request return result signal 288 to IN 132. Signals 286 and 288 can conform for example to the IS 41 protocol. IN 132 then sends a join calls signal 290 to IP 134 to join calls, for example conforming with SR 3511. The joined channels 230 and 280 are shown as channel 292. Channel 292 allows calling, MS 104 and called MS 114 to communicate with each other and for example can conform to the ISUP protocol.

It should be evident that for all described preferred embodiments, the usage of an audio caller identification facilitates the decision by called party 116 on whether to accept or reject the call. Typically, the audio caller identification is the name of calling party 102.

In some embodiments, it is assumed that the provider of network 100 prefers that the collect call be accepted, rather than rejected followed by a subsequent call back by called mobile MS 114 to calling MS 104. In these embodiments, the use of the name (rather than the phone number of calling MS 104) as the caller identification is especially advantageous because called party 116 would need to have access to the phone number of mobile station 104 in order to reject the call and call back mobile station 104. In some of these embodiments a time limit may be set for receiving the acceptance or rejection transmitted in step 404 and the process stopped if no response is received in time. In some embodiments a time limit may have been placed on the recording of the audio caller identification so as to not allow sufficient time for recording a phone number.

In other embodiments, the provider of network may not care if called party 116 rejects the call and instead calls back calling party 102. For example, the differential between the cost of a collect call and a regular call may be considered by the provider to be offset by the longer duration of the typical call back compared to the typical collect call. In these embodiments, any suitable audio caller identification which allows called part 116 to identify calling party 102 and either accept the call or call back would be advantageous.

It should also be evident that the voice of the calling party 102 per-se (i.e. regardless of the actual sound, syllable, word, or words spoken as the audio caller identification) may in many instances serve to further identify the calling party 102 to the called party 116 and enable the called party 116 to make an informed decision on whether to accept or reject the collect call.

In the illustrated preferred embodiments discussed above it is assumed that calling part 102 and called party 116 enter some responses to announcements using the touch tone pad of mobile stations 104 and 114 respectively (for example destination phone number, language selection, and/or acceptance/rejection of collect call). However it should be evident that in other preferred embodiments, caller 102 and called party 116 can alternatively speak the responses provided there is suitable a voice recognition system. The voice recognition system can be located for example as part of IP 134 or IVR 160.

Figure 7:
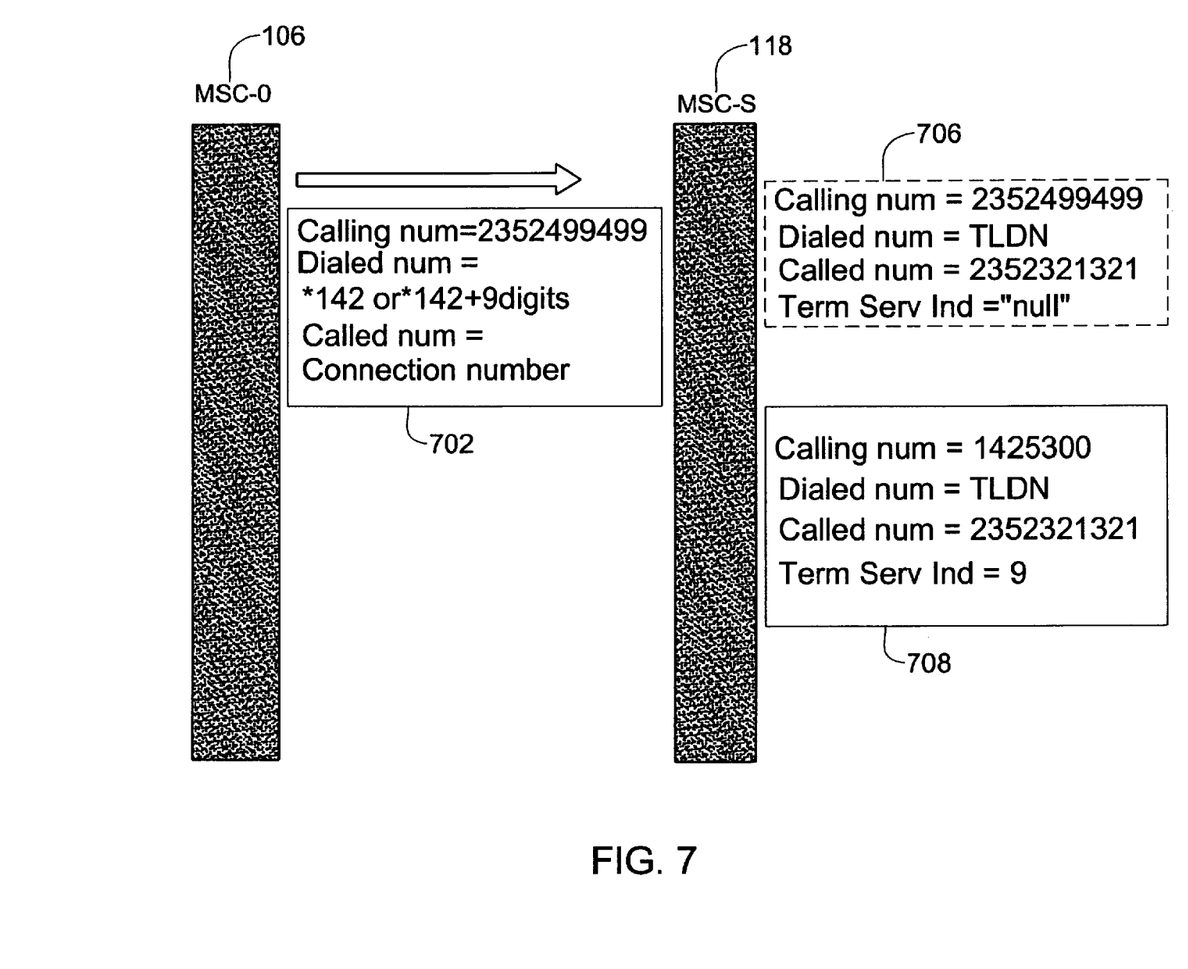
FIG. 7 is a diagram of CDR's generated for a mobile collect call, in accordance with a preferred embodiment of the present invention.

FIG. 7 shows some possible CDR's generated during the collect call, according to a preferred embodiment of the present invention, MSC-O 106 generates a CDR 702 which includes the dialed number (either the collect call indication or the collect call indication prefixing the destination phone number). CDR 702 also includes a calling number which in this example is the so MIN of calling MS 104, including the network identification (here "235") and the unique identification of calling MS 104 within the network (here "2499499"). A CDR 706 is a phantom CDR representing the CDR which would have been generated by MSC-S 118 if the call were not a collect call. The callings number would have identified calling MS 104 as the call initiator and the term service indicator field would have been null indicating a non-collect call. Because the call is a collect call, a CDR 708 is instead generated by MSC-S 118. The calling number field (which in his example includes as part the collect call indication) identifies IN 132 as the call initiator. In this example, collect call billing is indicated by the term service indicator field of CDR 708 set to 9. Mediation device 140 recognized CDR 708 as representing a collect call and forwards CDR 708 to billing system 142 so billing system 142 will bill called MS 114. (Preferably mediation device 140 does not forward CDR 702 to billing system 142). In some embodiments, the collect call billing indication used in CDR 708 may be identical to the collect call billing indication of signal 286 while in other embodiment the indications may differ.

Figure 8A:
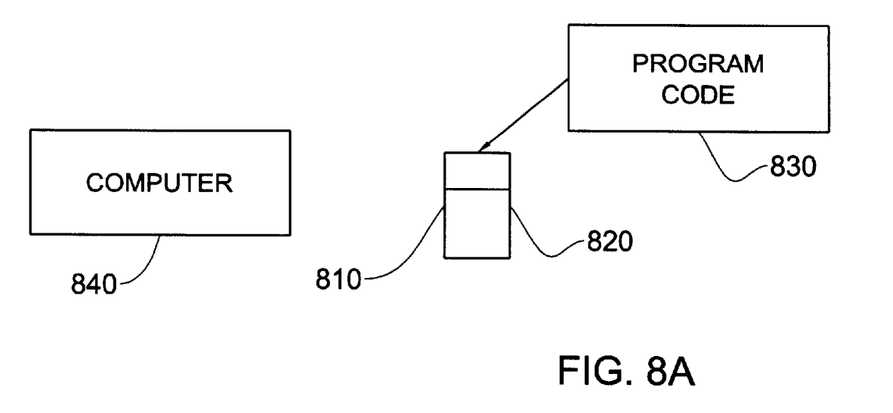
FIG. 8A illustrates a computer program product, in accordance with a preferred embodiment of the present invention.
Figure 8B:
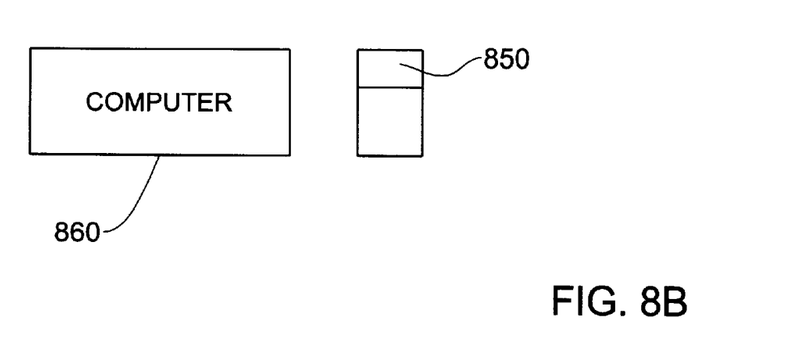
FIG. 8B illustrates a memory readable by machine, in accordance with a preferred embodiment of the present invention.

It will also be understood that the system according to the invention may be a suitably programmed computer. Likewise, the invention contemplates a computer program product 810 comprising a computer useable medium 820 having computer readable program code 830 embodied therein configured to cause a computer 840 to execute the method of the invention (see FIG. 8A). The invention further contemplates a memory 850 readable by a machine 860 tangibly embodying a program of instructions executable by the machine 860 for executing the method of the invention (see FIG. 8B where a computer is illustrated as an example of machine 860).

While the invention has been described with respect to a limited number of embodiments, it will be appreciated that many variations, modifications and other applications of the invention may be made.

What is claimed is:

1. A method for providing collect call service between mobile stations, comprising:
   receiving an indication that a call from a first mobile station is a collect call;
   establishing a first channel with said first mobile station;
   transmitting an audio request for an audio caller identification to said first mobile station via said first channel;
   receiving said audio caller identification via said first channel;
   establishing a second channel with a second mobile station;
   transmitting said received audio caller identification to said second mobile station via said second channel; and
   if in response to said transmitting said received audio caller identification, an acceptance indication for said collect call is received from said second mobile station, connecting said first mobile station and said second mobile station to each other.

2. The method of claim 1 further comprising:
   generating a call detail recording (CDR) including a collect call billing indication, thereby allowing billing said second mobile station for said collect call based on said CDR.

3. The method of claim 2, wherein provided said collect call is accepted by said second mobile station, said billing is for a call duration beginning approximately with said establishing of said second channel.

4. The method of claim 1 further comprising prior to establishing said second channel:
   receiving a destination identifier of said second mobile station;
   checking status information of said second mobile station corresponding to said received destination identifier; and
   depending on results of said checking, deciding whether to proceed with establishing said second channel or to end the method.

5. The method of claim 4, wherein said destination identifier is a telephone number of said second mobile station.

6. The method of claim 4, wherein said destination identifier is a mobile identification number of said second mobile station.

7. The method of claim 4, wherein said results include a prepaid balance or a prepaid balance range for said second mobile station.

8. The method of claim 1, further comprising prior to establishing said first channel:
   receiving a destination identifier of said second mobile station;
   checking status information of said second mobile station corresponding to said received destination identifier; and depending on results of said checking, deciding whether to proceed with establishing said first channel or to end the method.

9. The method of claim 8, wherein said destination identifier is a telephone number of said second mobile station.

10. The method of claim 8, wherein said destination identifier is a mobile identification number of said second mobile station.

11. The method of claim 8, wherein said results include a prepaid balance or a prepaid balance range for said second mobile station.

12. A method for providing collect call service between mobile stations, comprising:

receiving an indication that a call from a first mobile station is a collect call;

receiving a destination identifier for a second mobile station;

checking status information of said second mobile station corresponding to said received destination identifier;

depending on results of said checking, deciding whether to establish a first channel with said first mobile station or to end the method; and if a first channel is established, (i) transmitting an audio request for an audio caller identification to said first mobile station via said first channel, (ii) receiving said audio caller identification via said first channel, (iii) establishing a second channel with said second mobile station and transmitting said received audio caller identification to said second mobile station via said second channel, and (iv) if in response to said transmitting said received audio caller identification, an acceptance indication for said collect call is received from said second mobile station, connecting said first mobile station and said second mobile station to each other.

13. A system for providing collect call service between mobile stations, comprising:

at least one mobile switching center (MSC) configured to service a first mobile station and a second mobile station, wherein the MSC (MSC-O) among said at least one MSC which services said first mobile station is also configured to receive a collect call indication from said first mobile station;

an interactive voice response system (TVR) configured to receive a collect call indication from said MSC-O, configured to establish a first channel with a first mobile station and a second channel with a second mobile station, wherein said IVR is configured to receive via said first channel an audio caller identification, and is configured to transmit said audio caller identification via said second channel and to subsequently receive an acceptance or refusal of a collect call via said second channel, said IVR joining said first and second channels and thereby connecting said first and second mobile stations if acceptance is received.

14. A method to be performed in the system of claim 13, including:

an interactive voice response system (IVR) configured for receiving a collect call indication from said MSC-O by the TVR;

establishing a first channel with a first mobile station and a second channel with a second mobile station, wherein said IVR is configured to receive via said first channel an audio caller identification and transmitting from an IVR said audio caller identification via said second channel and to subsequently receive an acceptance or refusal of a collect call via said second channel, said IVR joining said first and second channels and thereby connecting said first and second mobile stations if acceptance is received.

* * * * *